US008024488B2

(12) United States Patent
Salowey et al.

(10) Patent No.: US 8,024,488 B2
(45) Date of Patent: Sep. 20, 2011

(54) METHODS AND APPARATUS TO VALIDATE CONFIGURATION OF COMPUTERIZED DEVICES

(75) Inventors: Joseph A. Salowey, Seattle, WA (US); Hao Zhou, Solon, OH (US)

(73) Assignee: Cisco Technology, Inc., San Jose, CA (US)

(*) Notice: Subject to any disclaimer, the term of this patent is extended or adjusted under 35 U.S.C. 154(b) by 1176 days.

(21) Appl. No.: 11/070,567

(22) Filed: Mar. 2, 2005

(65) Prior Publication Data

US 2006/0200856 A1   Sep. 7, 2006

(51) Int. Cl.
G06F 7/04 (2006.01)
G06F 15/16 (2006.01)
G06F 17/30 (2006.01)
H04L 29/06 (2006.01)

(52) U.S. Cl. .................. 710/5; 705/51; 705/57; 705/59; 710/8; 710/10; 710/11; 710/14; 710/15; 726/1; 726/4; 726/10; 726/11; 726/12; 726/13; 726/14; 726/29; 726/2; 726/17; 726/27; 726/28; 713/161; 713/162; 713/163; 713/182

(58) Field of Classification Search .................. 726/5
See application file for complete search history.

(56) References Cited

U.S. PATENT DOCUMENTS

| | | | | |
|---|---|---|---|---|
| 5,764,890 A | * | 6/1998 | Glasser et al. ................. 726/11 |
| 6,941,476 B2 | * | 9/2005 | Harrison et al. ................. 726/5 |
| 7,240,364 B1 | * | 7/2007 | Branscomb et al. ............... 726/9 |
| 7,380,025 B1 | * | 5/2008 | Riggins et al. ..................... 710/8 |
| 2002/0147764 A1 | * | 10/2002 | Krupczak ..................... 709/202 |
| 2003/0021283 A1 | * | 1/2003 | See et al. ....................... 370/401 |
| 2003/0065940 A1 | * | 4/2003 | Brezak et al. ................. 713/201 |
| 2004/0039937 A1 | * | 2/2004 | Aissi et al. ..................... 713/201 |
| 2005/0182944 A1 | * | 8/2005 | Wagner et al. ................ 713/182 |
| 2005/0228874 A1 | * | 10/2005 | Edgett et al. ................. 709/220 |

FOREIGN PATENT DOCUMENTS

WO   WO 2004097606 A1 * 11/2004

* cited by examiner

*Primary Examiner* — Nathan Flynn
*Assistant Examiner* — Bryan Wright
(74) *Attorney, Agent, or Firm* — Hickman Palermo Truong & Becker LLP (57) ABSTRACT

A system verifies configuration of a device within a network via an exchange of verification credentials, which are requested, received and authenticated. The verification credentials indicate that a configuration of the device was acceptable at the time of creation of the verification credentials for that device. The verification credentials of the device are obtained through a certifying process. During the certifying process, the credential certifier receives a current device configuration of the device in the network, and evaluates the current device configuration of a device with respect to its role within a network. The verification credentials are issued to the requesting device and stored within a database. The device submits its verification credentials if being requested by the other peer it's communicating with when it enters the network. It also monitors the current device configuration and if there are changes, it invalidates the existing certification credentials and requests new one.

18 Claims, 7 Drawing Sheets

METHODS AND APPARATUS TO VALIDATE CONFIGURATION OF COMPUTERIZED DEVICES

BACKGROUND

Conventional computerized devices, such as personal computers, laptop computers, and data communications devices (e.g., routers, switches, gateways and the like) exchange data over networks using a variety of communications mechanisms. In order to ensure privacy during these exchanges, and to prevent any malicious attacks, it is necessary to have a secured connection. One solution to this problem is via a Virtual Private Network (VPN), which creates a private network utilizing public networks and encryption and authentication technologies to allow secure remote access into a private network. A VPN allows users to privately and securely access a network such as a dedicated corporate network while remaining physically outside the dedicated network. Another solution is the authentication and authorization of devices before they are allowed to attach to a network using IEEE 802.1X related technologies for wired and wireless networks.

To ensure security, these solutions might utilize encryption and authentication to determine which computers are authorized to access a VPN termination device (e.g., VPN head end or concentrator), wireless access point or Ethernet switch. Authentication allows two devices that are in a process of setting up a secure connection to authenticate the identities of each other. Once authenticated, a secure communications session may be established between the client device and the access device over which all communications is encrypted.

Entities operating in a network are authorized to perform certain roles. In order for security to be maintained it is important that these devices are configured correctly for the roles they are authorized for. Miss-configurations often result in security vulnerabilities that can be exploited by an attacker. An example is default accounts that allow access to a device or application. Another example is an out of date software image that contains a bug allowing an attacker to take control of all or part of the system. Configuration may include the version and patch level of software and firmware; the types and versions of applications and services that are running (such as anti-virus software); the settings, options and data files configured in the software; and the hardware supporting the software.

SUMMARY

Conventional technologies for authorizing access to a network suffer from a variety of deficiencies. In particular, conventional techniques that provide security between conventional devices are limited to establishing network security, but do not ensure device security. For example, a conventional VPN which allows a computer to remotely access the network has no way to verify the configuration of that computer, and to provide that information to other computers on the VPN so that they can verify a configuration of the computer attempting communications. Computers on the network, or attempting to access the network, may have improper configurations that could cause communication problems or jeopardize security. These improper configurations could include lack of current patches, lack of certain installed security or protection software (e.g., no or out of date virus protection) and/or lack of current installed software images (e.g., out of date browser software).

One solution to this problem is to have a central authority that verifies the configuration of each computer on the network before allowing the computer to access the network. However, this solution might present network bottleneck issues. If the central authority is not available to verify the configuration of a computer attempting to access the network, the computer will not be able to connect to the network. If too many computers attempt to verify their configurations at the same time, a bottleneck may occur, which would degrade or prevent communication of the computers within the network.

Embodiments of the invention significantly overcome such deficiencies and provide a system that includes a configuration certifier or credential generator that supplies verification credentials to each computer on the network. Once a computerized device (subject) obtains verification credentials, each computerized device can then authenticate the verification credentials of any other computer on the network, without having to access the configuration certifier. The invention is based in part on the observation that security problems are often the result of a device miss-configuration, such as a lack of current patches and/or a lack of current images running on the hosts and devices on the network. The mechanism described herein allow for an entity (verifier) communicating with a peer (subject) to determine the currency of its peer's configuration as determined by a central authority at a recent previous point in time. The entity can then use this information to determine the level of trust and authorization to grant to the peer and to optionally inform a central authority of a peer that has dropped out of compliance.

During an example operation of one embodiment, suppose an employee tries to access a company network from home via a home computer. In order to access the network, the home computer needs to have its configuration certified. In order for the home computer to obtain verification credentials, the configuration certifier receives a current configuration of the home computer, and evaluates that configuration. In evaluating that configuration, both the role of that home computer within the network, and the actual configuration of the home computer are examined. The configuration sent to the configuration certifier can include, for example, a list of the applications and application version information installed on the home computer, as well as other information such as operating system version, user accounts, hardware profiles, and so forth. Some or all of such information may be sent from the home computer to the configuration certifier.

At the configuration certifier computer system, the configuration of the home computer is compared against acceptable computer configurations policy with respect to the roles of that home computer within the network. As an example, the certifier can maintain a list of minimum acceptable "employee computer" configurations that indicate what specific virus software and virus updates must be installed, what minimum browser version must be installed, what operating system version must be used, what patches or security updates must be installed, and the like. If the configuration from the home computer meets the configuration policy requirements for one or more roles, the configuration certifier generates verification credentials for that home computer. The verification credentials can include the roles allowed to the home computer and the version of the configuration policy used to determine the role access. The verification credentials can include an encoding of the identity of the employee's home computer (as authenticated during receipt of the configuration data) and can include a version indication, hash or other fingerprint associated with the configuration policy used to validate the current configuration of that home computer and a timestamp of the time of generation of the credentials. The verification credentials may also include additional attributes that may be used to constrain the roles of the home computer at evaluation time. The certifier cryptographically protects the verification credentials so they cannot be modified without detection using a technique such as digital signatures or message authentication codes. The verification credentials may be optionally encrypted to prevent disclosure of any sensitive data contained in the credentials. The configuration certifier issues (e.g., securely transfers) them to the home computer, and also stores the verification credentials within a database maintained by the configuration certifier. It should be noted that one of the purposes of encrypting the verification credentials is to cryptographically protect the verification credentials from modification. Essentially, the verification credentials indicate that the configuration of that employee's computer meets the configuration policy of the certifier at the time of generation of the credentials. The certifier uses a cryptographic technology such as public key cryptography to protect the integrity of the verification credentials, and makes the public key available for a computer that needs to decrypt the credentials. It is also possible that the certifier uses a symmetric key technology to protect the credential and use a key management scheme such as Group Domain of Interpretation (GDOI) for ISAKMP or Kerberos to manage access to the keys. It should be noted that one of the purposes of decrypting the verification credentials is to verify that the verification credentials have not been modified.

When that home computer tries to access another computer within the corporate network, such as for example, an edge router or other data communications device that operates as a gateway to the corporate network (or a server within the company), the data communications device, acting as a verifier, requests verification credentials from the home computer. The home computer sends the protected verification credentials, which are received by the data communications device (or a computer such as a server within the corporate network). The data communications device has the public key of the configuration certifier, which allows it to authenticate the verification credentials.

Depending upon the configuration, verification can consist of some or all of the following operations: 1. Authenticating the computer to determine its identity; 2. Obtaining the verification credential 3. Authenticating the verification credential by verifying its signature; 4. Checking that the credential has not expired using a timestamp of the credential, or by checking a list of expired credentials; 5. Checking the credentials against any credential revocation list mechanisms (may be policy based); 6. Checking that the validation credential contain the computer identity authenticated when the credentials were received; 7. Checking that the validation credentials specify an appropriate role of the computer attempting the connection; 8. Verifying that there are no additional constraints on the role of the computer based on attributes in the credential. Depending upon the configuration, if any (or all) of these tests pass, then verification passes. Generally, the verification credentials certify that the home computer's configuration was acceptable for certain roles at the time the verification credentials were issued. Once the verification credentials are verified, the data communications device can allow the home computer access to the network in accordance with the roles it is allowed.

Likewise, once within the network, the home computer might attempt to access a server within the corporate network. The server might also have credentials and the home computer can use the aforementioned techniques to verify the server's configuration.

More specifically, embodiments of the present invention secure a network without relying on a central authority to verify the configuration of every computer on the network at the time of access to the network. According to some embodiments of the invention, the verifier authenticates the verification credentials for the device which indicate that a configuration of the device was acceptable at the time of creation of the verification credentials for that device. In one embodiment the verification credentials are obtained directly from the device. In another embodiment the verification credentials are obtained from a distributed online database such as a directory. If necessary, the verifier decrypts the verification credentials using encryption information associated with a credential generator, which issued the verification credentials. The verifier verifies that the verification credentials have not been tampered with and expired, and that they contain the identity of the device. The verifier then compares the verification credentials with credential revocation information to determine if the credential has been revoked. The verifier may use additional attributes within the credentials to constrain which roles are allowed to the device. The verifier applies enforcement policy consistent with the roles specified in the verification credentials. In this manner, verification of configuration of a device can take place between the device and another device that are to engage in communications, without having to involve a third part verification computer.

In one configuration, the verifier obtains a credential revocation list containing a list of revoked verification credential identifiers, and compares the identity of the credentials belonging to the device with the list of revoked verification credential identifiers. Alternatively, the verifier obtains a policy based credential revocation list, and compares the version of the policy used to generate the information in the credential or other information with attributes contained in the verification credentials to determine whether the verification credentials is revoked. For example, if the version of the policy used to generate the information in the credential or other information is less than the version specified in the policy based credential revocation list, then the policy has been changed since the credential was generated and thus all or part of the verification credentials should not be accepted.

In one embodiment, the verifier passes the verification. In another embodiment, the verifier fails the verification. If the verifier fails the verification, the verifier specifies a security level on which the device can operate within the network. The verifier can also notify a management system that verification failed and the reason for the failure so it can take appropriate action to remedy the situation.

Generally, verification credentials are requested and obtained by the device before hand (out-of-band), then are used during access to the network. However if verification fails as a result of missing or invalid verification credentials, the system may fall back to an in-band verification process that requests and obtains verification credentials while the device requesting access to the network.

In one embodiment, when validation fails the verifier can request the device to send its configuration data and forward them to the certifier for verification, in the case when the device requesting access to the network doesn't have the verification credentials or its verification credentials cannot be verified (e.g., expired). Instead of denying access or putting it on some limited level of access, the verifier can fall back to requesting the device for all or a subset of its configuration data and forward to certifier for in-time certification. Once verification credentials are obtained on the device's behalf from the certifier, the verifier can follow the normal verification process. The newly obtained verification credentials are sent back to the device and can be used for subsequent use. This would require the verifier has a connection to the certifier, but since it is only needed in rare cases when verification credentials are missing or invalid, it should still eliminate the central authority bottleneck problem. The transmission of the configuration data and verification credentials should be protected from eavesdropping and tampering.

In one embodiment, the configuration certifier receives a current device configuration from the device in the network, and evaluates the current device configuration of a device within a network, the evaluation including verifying the configuration of the device with respect to a role of the device within the network and comparing an image of the device against a list of acceptable device configurations. The configuration certifier obtains role indications of the device specified in the current device configuration, and determines if the role indications are acceptable for the device. If so, the configuration certifier obtains the image of the device specified in the current device configuration, the image indicating a software configuration of the device that identifies specific software programs installed within the device. For each acceptable device configuration that corresponds to a role indication of the device, the configuration certifier compares the software configuration of the device to the list of acceptable device configurations for that role to determine if the software configuration is acceptable for that device to act as that role.

The configuration certifier issues verification credentials indicating the current configuration of the device meets the requirements for one or more roles at the time of creation of the verification credentials for that device. The configuration certifier generates verification attributes by applying configuration policy to the current device configuration. The verification attributes can include the types and versions of the configuration policies that were evaluated, the acceptable roles of the device, type of device, image version and additional attributes that can constrain the allowed roles of the device at verification time. The configuration certifier encapsulates the verification attributes along with an identity of the device, the time of issue, the time of expiration (or time of next required certification) into the verification credentials, cryptographically protects and optionally encrypts the verification credentials; and transfers the verification credentials to the device, with the verification credentials indicating that the current device configuration is certified at the time of issuance of the verification credentials. The configuration certifier provides cryptographic key information that enables remote devices to authenticate and decrypt the verification credentials issued to the device. The configuration certifier stores the verification credentials and maintains a list of revoked verification credentials. The configuration certifier returns the verification credentials to the subject. The configuration certifier may also store the credentials in a distributed online database. Generally, the verification credentials are short-lived, compared to identity credentials. Since configuration of a computing device is dynamic and easily changeable, maintaining a short live span for the verification credentials ensures that configuration data can be reexamined and certified at appropriate intervals.

In one embodiment, a computer device (subject) sends its configuration data to the certifier and requests for verification credentials. Once the verification credentials are issued and returned, the subject stores them in secured storage and uses them for subsequent network access. The subject also monitors the configuration of the device. If any change is occurred, it discards the verification credentials and request for new ones. Upon request from a verifier, the subject may if allowed by its policy send its configuration data to obtain new verification credentials in the case the existing one is expired or invalid.

Other embodiments of the invention include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment of the invention.

Other embodiments of the invention that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments of the invention.

It is to be understood that the system of the invention may be embodied strictly as a software program, as software and hardware, or as hardware alone. The features of the invention, as explained herein, may be employed in data communications devices and other computerized devices and software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the invention include a configuration certifier or credential generator that supplies verification credentials to devices in a network environment that later allows those devices to verify and authenticate the configuration of those devices was acceptable to the certifier at the time of generation of those credentials. The system disclosed herein includes a subject device that is going to have its configuration and software validated. A configuration certifier operates to evaluate the configuration of the subject device and issue a verifiable certificate referred to herein as verification credentials that attest to the state of configuration and software on the system at the time of generation of those credentials. A verifier who wants to verify the state of the configuration of a subject device has a trust relationship with the certifier. Once a computerized device obtains the certifier's credentials, it can then authenticate the verification credentials of any other computer on the network, without having to access the configuration certifier. The invention is based in part on the observation that security problems are often the result of a device miss-configuration for the roles it is authorized to operate. Examples include lack of current patches, lack of current images running on the hosts and devices on the network, inappropriate software settings, and invalid hardware setup. The mechanisms described herein allow for an entity communicating with a peer to determine the currency of its peer's configuration as determined by a central authority at a recent previous point in time. The entity can then use this information to determine the level of trust and authorization to grant to the peer and to inform a central authority of a peer that has dropped out of compliance.

In order for a device to obtain verification credentials, the configuration certifier receives a current configuration of the device and evaluates that configuration. The certifier can request configuration information that it needs to evaluate the configuration policy. In evaluating the configuration policy, both the roles of that device within the network, and the actual configuration of the device are examined. The system can also take into account other information, such as what type of connections or access the device will be requesting to a network. The configuration sent to the configuration certifier can include, for example, a list of the applications and application version information installed on the device, as well as other information such as operating system version, user accounts, hardware profiles, and so forth. Some or all of such information may be sent from the device to the configuration certifier.

At the configuration certifier computer system, the configuration of the device is compared against acceptable configurations with respect to the role of that device within the network. As an example, the certifier can maintain a list of minimum acceptable device configurations that indicate what specific virus software and virus updates must be installed, what minimum hardware must be installed, what operating system version must be used, what patches or security updates must be installed, and the like. If the configuration from the device meets the configuration policy requirements for one or more roles, the configuration certifier generates verification credentials for that device. The verification credentials can include the roles allowed to the device and the version of the configuration policy used to determine the role access. The verification credentials can include an encoding of the identity of the device (as authenticated during receipt of the configuration data) such as the device's Media Access Control (MAC) address, or name. They can also include version indication, hash or other fingerprint associated with the configuration policy used to validate the configuration of that device and a timestamp of the time of generation of the credentials. The verification credentials may also include additional attributes that may be used to constrain the roles of the home computer at evaluation time. The certifier cryptographically protects the verification credentials so they cannot be modified without detection using a technique such as digital signatures or message authentication codes. The verification credentials may be optionally encrypted to prevent disclosure of any sensitive data contained in the credentials. The configuration certifier issues (e.g., securely transfers) them to the device, and also stores the verification credentials within a database maintained by the configuration certifier. Essentially, the verification credentials indicate that the configuration of that device meets the configuration policy of the certifier at the time of generation of the credentials. The certifier can use cryptographic technology such as public key cryptography to protect the integrity of the verification credentials verification credentials, and makes the public key available for a computer that needs to decrypt and verify the credentials.

When that device tries to access another computer within the corporate network, such as for example, a server or an edge router or other data communications device that operates as a gateway to the corporate network (or any server), the data communications device, acting as a verifier, requests verification credentials from the device attempting to make a connection. In response, the device sends the protected verification credentials, which are received by the data communications device (or a computer such as a server within the corporate network). The data communications device has the cryptographic key information of the configuration certifier, which allows it to authenticate and check the integrity of the verification credentials.

Depending upon the configuration, verification can consist of some or all of the following operations: 1. Authenticating the device to determine its identity (can be done during obtaining the verification credential); 2. Obtaining the verification credential; 3. Authenticating the verification credential by verifying its signature; 4. Checking that the credential has not expired using a timestamp of the credential, or by checking a list of expired credentials; 5. Checking the credentials against any credential revocation list mechanisms (may be policy based); 6. Checking that the validation credential contain the device identity authenticated when the credentials were received; 7. Checking that the validation credentials specify an appropriate role of the device attempting the connection; 8. Verifying that there are no additional constrains on the role of the device based on attributes in the credentials. Depending upon the configuration, if any (or all) of these tests pass, then verification passes. Generally speaking, the verification credentials certify that the device configuration was acceptable for one or more roles at the time the verification credentials were issued. Once the verification credentials are verified, the data communications device can allow the device access to the network in accordance with the roles it is allowed.

In one configuration, the credentials can include and indicate an expiration time at which they are no longer valid (e.g., valid for 24 hours after issuance). The subject device must periodically have its configuration and software re-checked by the certifier before this time in order to stay in compliance. Configuration or image changes on the device may also trigger the subject device to be re-checked. The certifier will return new credentials to the subject each time. The certifier may also store the credential in a database to make it available in other ways and may list the old credentials as being expired or revoked in a credential revocation list.

If a credential validation fails for some reason, the verifier can take several actions: it can refuse to communicate with the device, it could apply policy to place the device at a lower trust level in the network and/or it can send alerts to a management system indicating that it is communicating with a subject device that is out of compliance. It may also attempt to fall back to an in-band credential acquisition where it proxies communication between the subject and the configuration certifier to acquire new verification credentials for the device and then grants access accordingly.

If the subject device's configuration is changed, then the device needs to be re-validated by the certifier. If the validation succeeds then a new credentials are issued. If not, then the subject device's existing credentials are added to a current revocation list and this list is distributed for access by devices that operate as verifiers. If the subject device does not contact the certifier then the credentials will eventually expire. The aforementioned configurations will now be explained in more detail with respect to the figures and the following disclosure.

Figure 1:
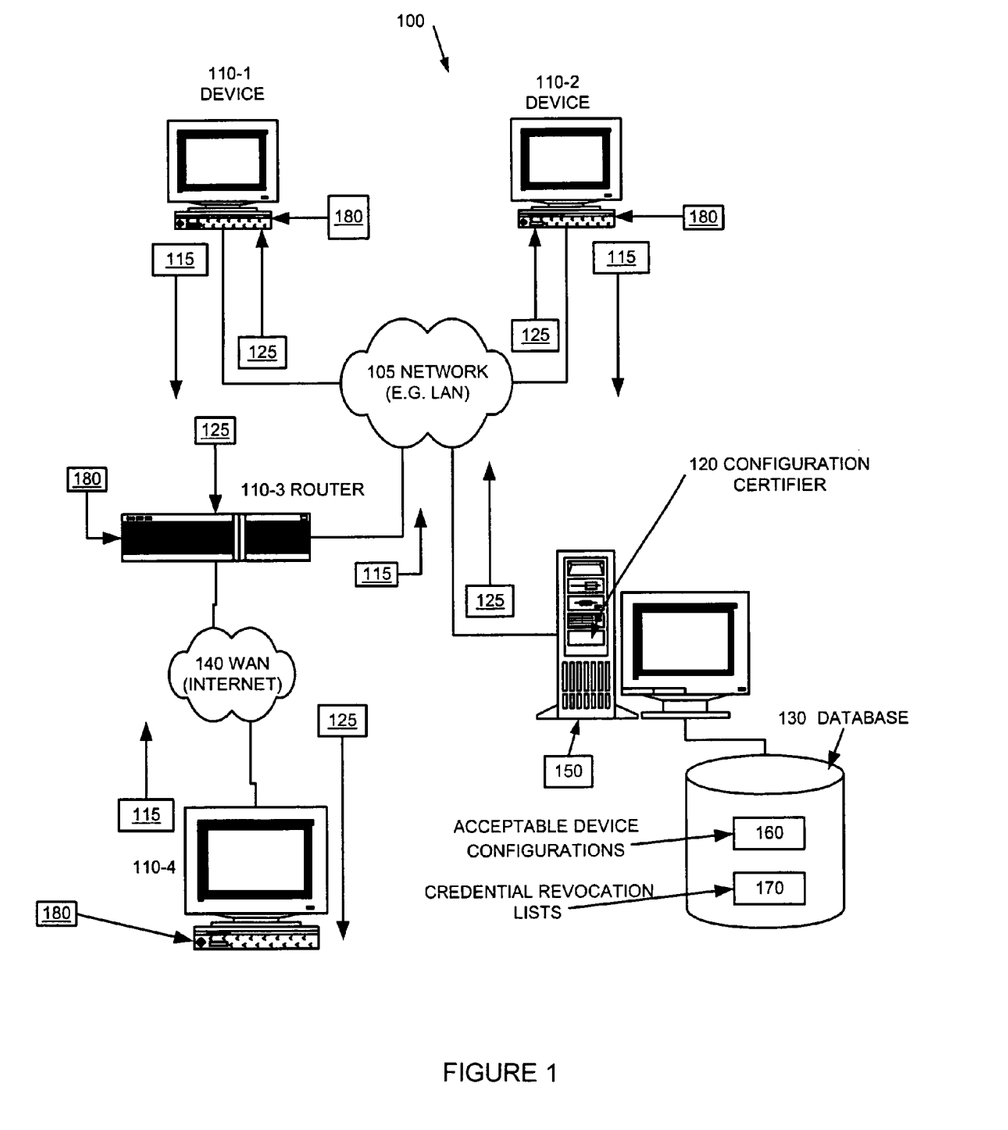
FIG. 1 shows a high level view of a network according to one embodiment of the invention.

FIG. 1 illustrates an example computer networking environment 100 suitable for use in explaining example embodiments of the invention. The computer networking environment 100 includes a computer network 105, such as a local area network (LAN) which interconnects various devices 110-1 through 110-4. It should be noted that some devices 110 can also exist outside the local area network 105, and can connect to the local area network 105 via a wide area network 140, such as the Internet, which allows communication between device 110, and other computers worldwide. On (e.g., executing within) any particular device 110, there may exist a verifier agent 180 such as a software process that allows the device 110 to verify other devices on the network 105 as will be explained in detail shortly.

For a device 110 to be verified by another device, that device 110 requests verification credentials 125 from the configuration certifier computer system 150. Residing on the configuration certifier computer system 150 is the configuration certifier 120, which receives such requests and issues the verification credentials 125 to those requesting devices 110. In this exchange, the configuration certifier 120 receives a current device configuration 115 from a device 110 in the network 100, and evaluates the current device configuration 115. The configuration certifier 120 compares the current device configuration 115 of the device 110 against a list of acceptable device configurations 160, with respect to the role of the device 110 within the network 105, and also (optionally) against credential revocation lists 170, contained within database 130. Once verification credentials 125 are created, they are stored in database 130. The verification credentials 125 are then issued to the device 110 via the network 105.

Each device 110 may be any type of computer system, workstation, server (e.g. web server), personal computer, laptop, mainframe, personal digital assistant devices, general purpose, or dedicated computer devices or the like, which operate any type of software, firmware or operating system. A device 110 may also be a data communication device (e.g. router, switch). The device 110 may be physically or wirelessly coupled to the network 105 to support communications. A device 110 may request verification credentials 125 at any time, and should preferably request new verification credentials 125 when a configuration change has been made to the device 110 (e.g., such as when new software or hardware has been installed, removed or reconfigured within the device), or when the current verification credentials 125 are about to expire.

When the device 110 requests verification credentials 125, the configuration certifier 120 receives a current device configuration 115, and evaluates that configuration. The configuration certifier 120 examines both the roles of the device 110 within the network 100, and the current device configuration 115. The configuration certifier 120 can also take into account other information, such as what type of access the device 110 will be requesting to the network 100. The configuration certifier 120 generates and issues verification credentials 125, indicating the current configuration of the device 110 at the time of creation of the verification credentials 125 for that device 110. The verification credentials 125 can also contain the roles authorized to the device 110 and the type and version of the policy used to determine the role access. The verification credential 125 can also contain additional attributes that may used to constrain the roles of the device 110 at evaluation time. The verification credentials 125 also can contain an expiration date or time for the verification credentials 125 that indicates a period for which they are valid. The configuration certifier 120 cryptographically protects the verification credentials 125 so they cannot be modified without detection, and issues the verification credentials 125 to the device 110. The verification credentials 125 may be optionally encrypted to prevent disclosure of any sensitive data contained within the credentials. The configuration certifier 120 provides cryptographic key information which enables remote devices to authenticate and decrypt the verification credentials 125 issued to the device 110. This may include a public key or other type of mechanism to allow remote device to decrypt the credentials for verification of configuration of a device. Further details of configurations explained herein will now be provided with respect to a flow chart of processing steps that show the high-level operation of configurations of the invention to issue verification credentials. After issuance of verification credentials is explained in this example configuration, use of such credentials by a device to verify the configuration of another device (for which the credentials were generated) will be explained thereafter.

Figure 2:
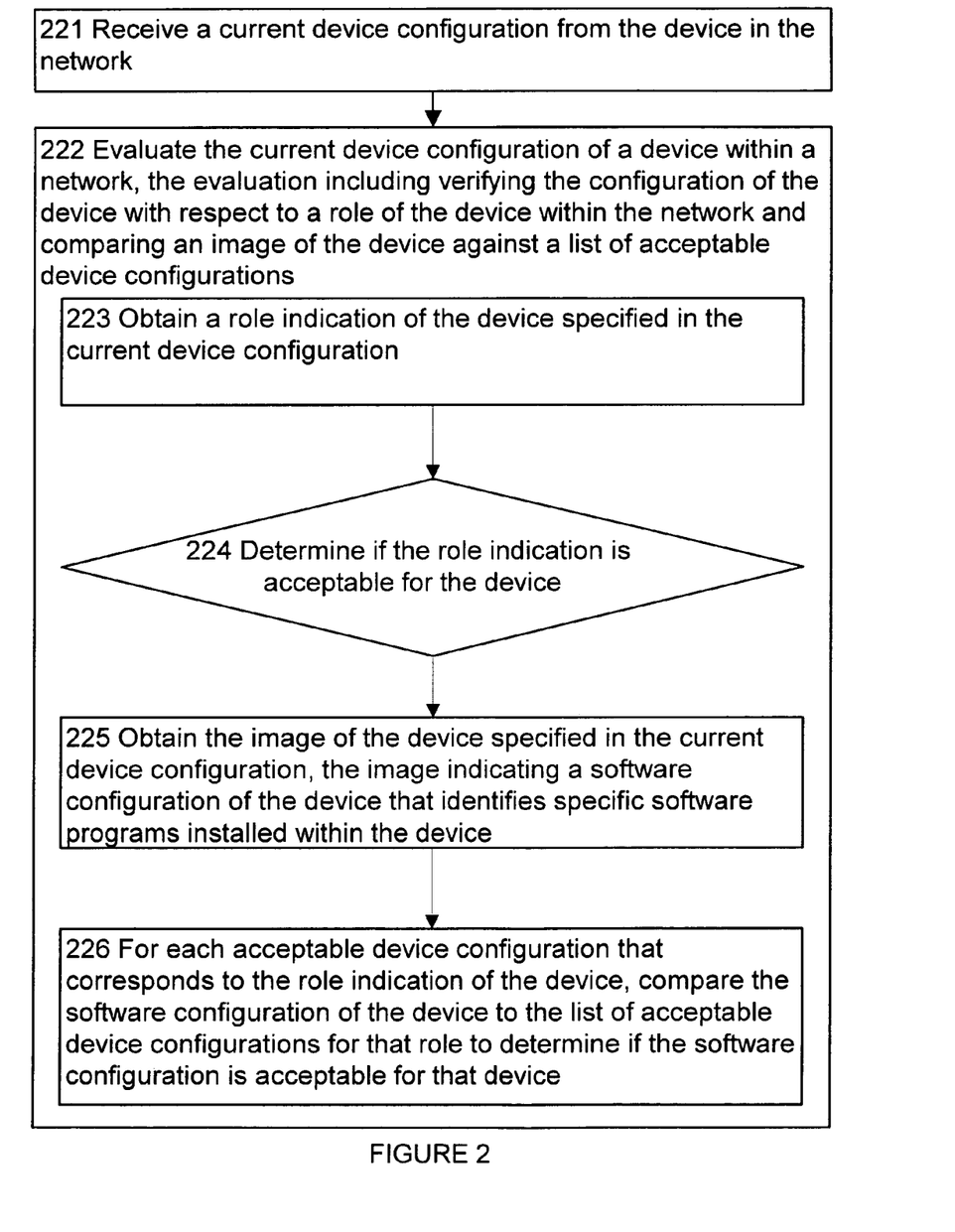
FIG. 2 illustrates a flowchart of a procedure performed by the system of FIG. 1 when the configuration certifier process certifies the configuration of a device within a network, according to one embodiment of the invention.

FIG. 2 is a flowchart of the steps performed by the configuration certifier 120 to evaluate the configuration of a device 110 within a network 105 when the device 110 requests verification credentials 125 from the configuration certifier 120, and to provide verification credentials to the device once its configuration has been validated or accepted.

In step 221, the configuration certifier 120 receives a current device configuration 115 from the device 110 in the network 105. The current device configuration 115 may contain software applications and version information of those software applications loaded on the device 110. The current device configuration 115 may also contain operating system information, user accounts, and/or hardware profiles. The configuration certifier 120 optionally authenticates the device 100 to determine its identity and the roles the device is authorized to perform. The configuration certifier 120 requests current device configuration 115 from the device 110 in the network 105 necessary to evaluate the configuration policy.

In step 222, the configuration certifier 120 evaluates the current device configuration 115 of a device 110 within a network 105. The evaluation includes verifying the configuration of the device 110 with respect to the role of the device 110 within the network 105, and comparing an image of the device 110 against a list of acceptable device configurations. This will be further explained within the sub steps of 223 through 226.

In step 223, the configuration certifier 120 obtain role indications of the device 110 specified in the current device configuration 115. The role indications of the device 110 must be appropriate for that device 110. The current device configuration 115 must also be appropriate for the role indications of the device 110. In step 224, the configuration certifier 120 determines if the role indications are acceptable for the device 110. In this step, the configuration certifier 120 compares the role indications of the device 110 with role indications allowed to devices of the type of device 110 and with role indications allowed to devices with the identity of device 110.

In step 225, if the configuration certifier 120 determines the role indications are acceptable for the device 110, the configuration certifier 120 obtains the image of the device 110 specified in the current device configuration 115. That image indicates a configuration of the device 110 that identifies specific software programs and hardware installed within the device 110.

In step 226, for each acceptable device configuration that corresponds to a role indication of the device 110, the configuration certifier 120 compares the software configuration of the device 110 to the list of acceptable device configuration policy for that role to determine if the software configuration is acceptable for that device 110. As an example, if the device 110 requesting credentials identifies itself in its configuration 115 as a data communications device, such as a router or switch operating in a network, and the configuration 115 it sends to the certifier 120 indicates that the data communications device 110 is configured with certain versions of data communications software (e.g., such as a certain version of router control software) or is operating certain data communications features (e.g., is a multicast enabled router), the certifier can be sure that the configuration 115 identifies software appropriate for that type of device and can ensure that the operating configuration parameters of the device, as specified in the configuration 115, are appropriate. As an alternative, if the device 110 provides a configuration 115 that indicates its role is a personal computer, the configuration 115 might be required, by the certifier 120, to have acceptable personal computer software installed, such as appropriate virus protection, or a certain minimum operating system version, or absence of virus infections, and the like.

Figure 3:
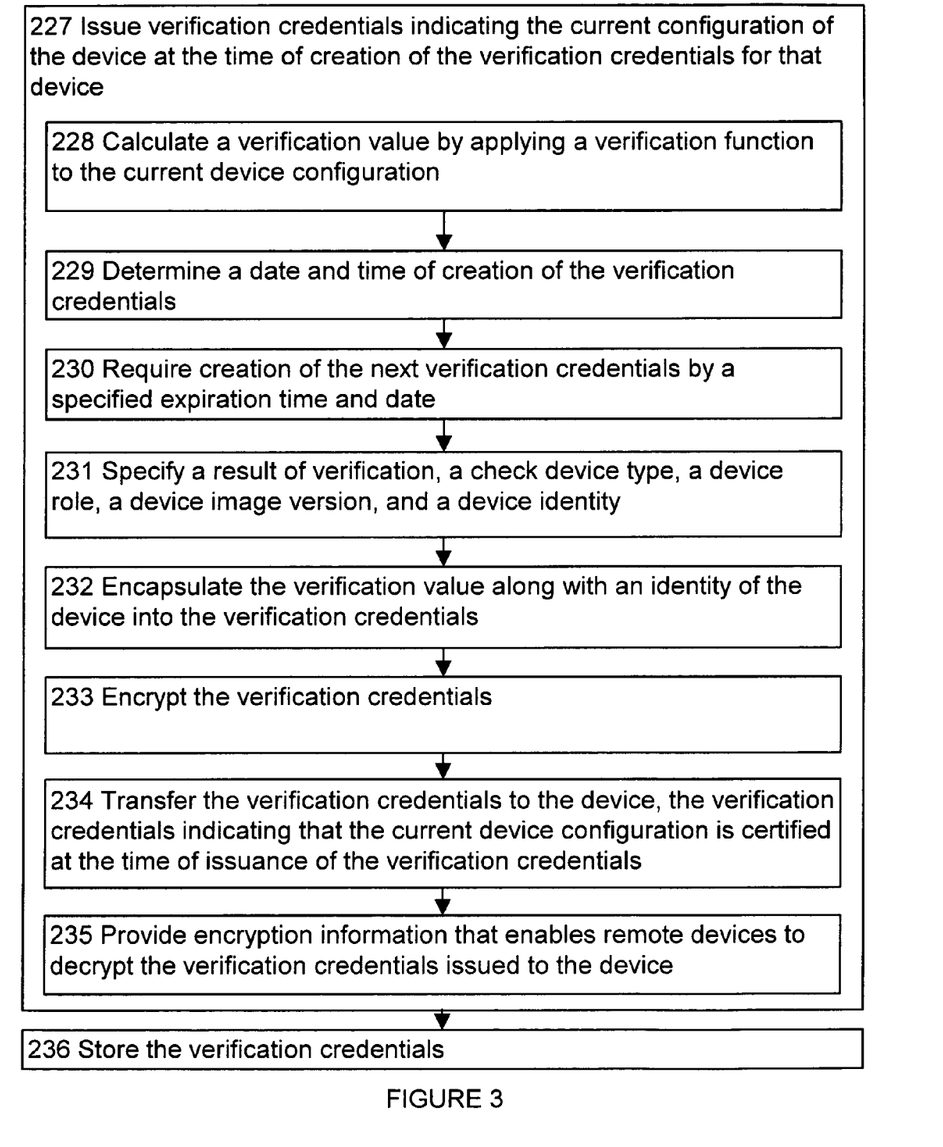
FIG. 3 illustrates a flowchart of a procedure performed by the system of FIG. 1 when the configuration certifier process issues a verification credential, according to one embodiment of the invention.

FIG. 3 is a flowchart of the steps to issue verification credentials 125, and store the issued verification credentials 125. Verification credentials 125 are issued after the configuration generator 120 has examined, and evaluated the information received within the current device configuration 115.

In step 227, assuming that an acceptable configuration was identified in step 226, the configuration certifier 120 issues verification credentials 125 indicating (i.e., accepting or indicating as allowable) the current configuration of the device 110 for the specified roles at the time of creation of the verification credentials 125 for that device. This will be further explained within the sub steps of 228 through 235.

In step 228, the configuration certifier 120 calculates verification attributes by applying a verification function to the current device configuration 115. This verification value can be used to determine a trust level and roles on which the device 110 can operate within the network 105. As an example, if software specified in the configuration 115 indicates an older version of an operating system is in use on a personal computer device 110 that is requesting verification credentials, and that older version is known to have security issues, then a verification attribute indicating a lower trust level is generated for the set of roles that is allowed. Additionally, the verification attribute may be a version, hash or other fingerprint of the device configuration policy that was evaluated as part of the validation function. The verification attributes may also contain additional attributes which can be used to constrain the roles authorized or trust level assigned to a device 110 at evaluation.

In step 229, the configuration certifier 120 determines a date and time of creation of the verification credentials 125. This information may be used to determine the expiration date of the verification credentials 125. Verification credentials 125 can expire based on this expiration date, or can expire if the current device configuration 115 is no longer accurate, such as when new software has been loaded on the device 110 or if the version of software currently on the device 110, is no longer current.

In step 230, the configuration certifier 120 requires creation of the next verification credentials 125 by a specified expiration time and date. A device 110 that has expired verification credentials 125 will have those expired verification credentials 125 placed on a credential revocation list 170.

In step 231, the configuration certifier 120 specifies a result of verification, a check device type, a device role, a device image version, and a device identity.

In step 232, the configuration certifier 120 encapsulates the verification attributes along with an identity of the device into the verification credentials 125. This may include encoding the identity of the device 110. This may also include applying a hashing function to the current configuration and a timestamp of the time of generation of the verification credentials 125. It may also include a timestamp or time of the next required configuration certification.

In step 233, the configuration certifier 120 cryptographically protects the verification credentials 125 from modification. This can be performed using any sort of encryption technology, such as PKI (Public Key Infrastructure) encryption or symmetric key cryptography. Generally, the configuration certifier thus processes the verification credentials to allow a recipient of the credentials to verify that the verification credentials have not been modified.

In step 234, the configuration certifier 120 transfers the verification credentials 125 to the device 110. The verification credentials 125 indicate that the current device configuration 115 is certified at the time of issuance of the verification credentials 125.

In step 235, the configuration certifier 120 provides cryptographic key information that enables remote devices to authenticate and decrypt the verification credentials 125 issued to the device 110. It should be noted that the configuration certifier 120 may provide cryptographic key information to devices which do not have verification credentials 125, or devices which have expired verification credentials 125. This will provide devices without verification credentials 125 or with expired verification credentials 125, the ability to decrypt the verification credentials 125 received from a device 110 having valid verification credentials 125. Generally then, this allows the configuration certifier 120 to provide confirmation information that enables remote devices to verify the verification credentials issued to the device have not been modified In step 236, the configuration certifier 120 stores the verification credentials 125 in a database 130. Also stored in the database 130 are the credential revocation lists 170, the acceptable device configurations 160, and the result of verification. The database 130 may be a distributed database.

Figure 4:
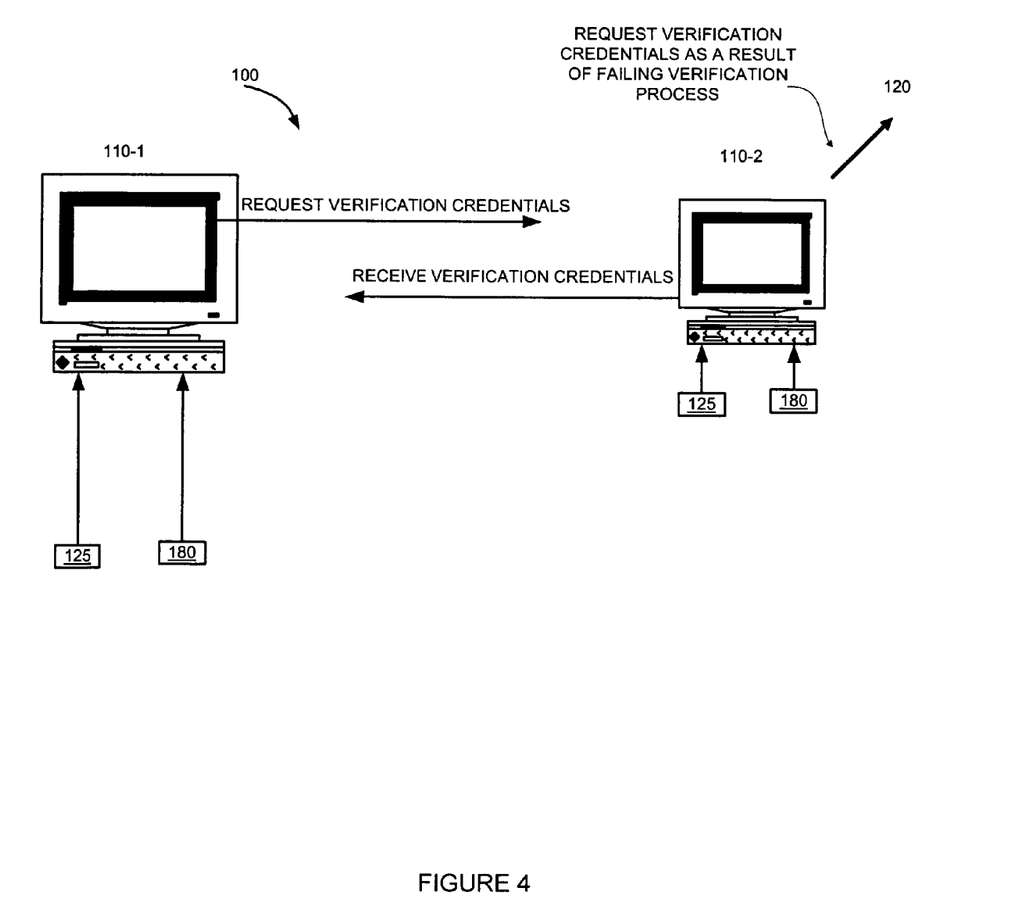
FIG. 4 shows the process of verifying the configuration of a device within a network, according to one embodiment of the invention.

FIG. 4 illustrates the process of verifying the configuration of a device within a network 100. This process allows devices on the network to verify the configuration of other devices on the network, without having to be in communication with the configuration certifier computer system 150 at the time of verification. This prevents the network from getting bottlenecked with requests to the configuration certifier 120 as each device 110 requests verification, while still preserving security within the network by maintaining the verification process. The process of devices verifying other devices within the network without requiring a simultaneous connection to the the configuration certifier computer system 150, allows the verification process to occur even if the configuration certifier computer system 150 is unavailable.

As discussed above, within the network 100, there exists a plurality of devices 110. Within each device 110 in this example resides a verifier agent 180, which allows each device 110 to verify other devices on the network 100. If a device 110 has requested, and been issued verification credentials 125, as previously explained above, these verification credentials 125 also exist on the device 110 and that device can be verified to other devices 110 that operate verifier agents 180. In this example described herein, it is assumed that any device 110 within the network 100 can request verification credentials 125 from any other device 110 within the network 100, though configurations can be provided in which only some devices are verifiers and only some devices have credentials. It should be noted that devices which do not have verification credentials 125, may still be able to receive, validate and decrypt verification credentials 125 from devices having verification credentials 125.

Within the network 100, suppose for this example that a device 110-2 tries to access the device 110-1 in some manner. Suppose for this example that the device 110-2 is attempting to access data within the device 110-1. The device 110-1, acting as a verifier, requests verification credentials 125 from the device 110-2. The device 110-1 then receives, and authenticates the verification credentials 125 of device 110-2 as will be explained below, to determine the currency of software and configuration at the time the verification credentials 125 were issued to the device 110-2. This information can be used to determine the level of trust and authorization to grant to the device 110-2, and to inform the configuration certifier 120 if device 110-2 is out of compliance. If the configuration certifier 120 is informed that the device 110-2 is out of compliance, this information may be sent to the configuration certifier 120, or another management system. Device 110-1 has the public key (or similar verification key) of the configuration certifier 120, which allows device 110-1 to validate the verification credentials 125 received from device 110-2. Once the verification credentials 125 have been validated, device 110-1 can then authenticate the verification credentials 125 of device 110-2. The verification credentials 125 verify that the device configuration was acceptable at the time the verification credentials 125 were issued. Once the verification credentials 125 are verified, device 110-1 can provide device 110-2 access to the data it is requesting. Further details of this processing will now be provided with reference to the following flow chart of processing steps.

Figure 5:
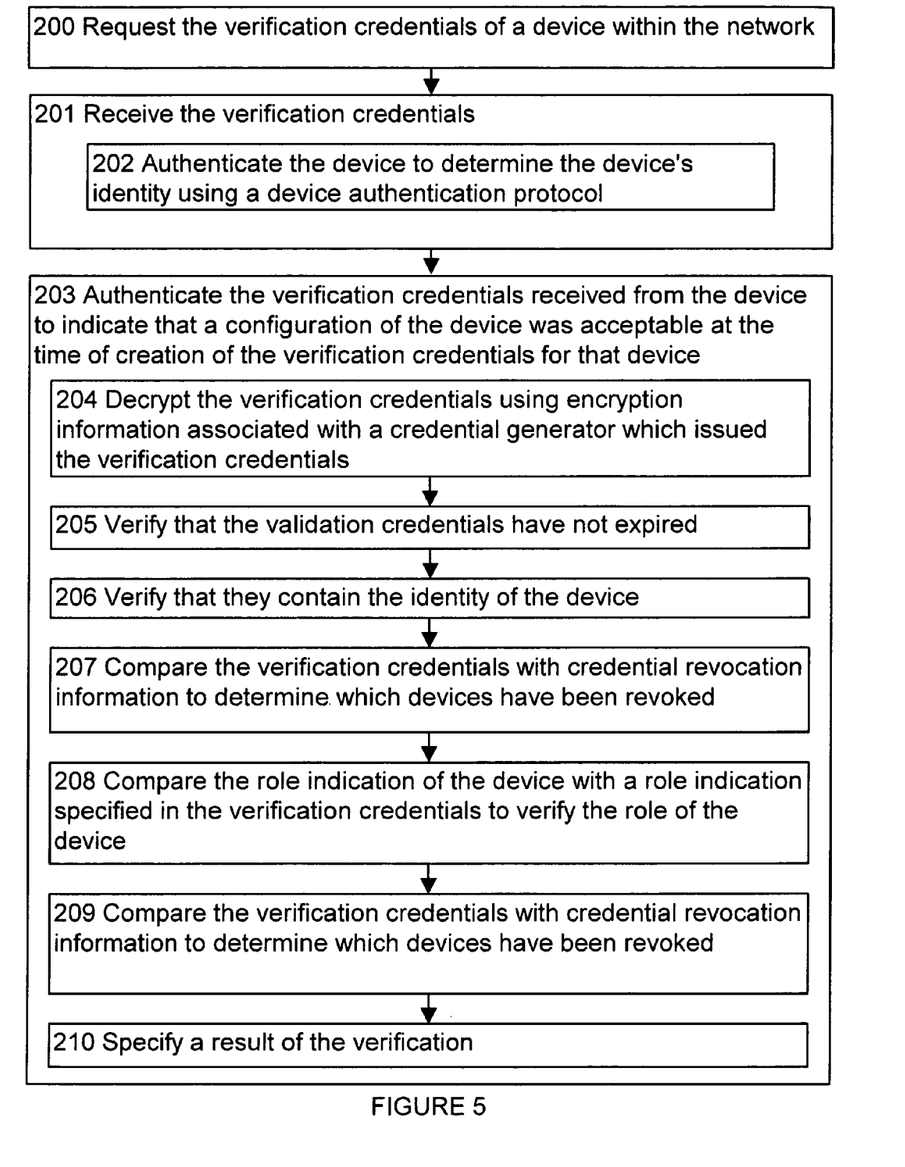
FIG. 5 illustrates a flowchart of a procedure performed by the system of FIG. 4 when the verifier process verifies the configuration of a device within a network, according to one embodiment of the invention.

FIG. 5 is a flowchart of the steps to verify the configuration of a device within a network when a device 110-1 in the network 100 requests the verification credentials 125 of another device 110-2 in the network 100. This verification process is completed without contacting the configuration certifier 120 on the configuration certifier computer system 150.

In Step 200, the verifier, in this example, 110-1, requests the verification credentials 125 of a device 110-2 within the network 100. While in this example, the verifying device 110-1 is acting as the verifier, in another example, the device 110-2 being verified could act as the verifier, verifying the credentials of 110-1.

In Step 201, the verifier, in this example, device 110-1, receives the verification credentials 125 from device 110-2. This will be further explained within the sub step of 202. It is also possible to have the verifier receive the credentials from an online distributed database if they are not available from the device 110.

In Step 202, the verifier authenticates the device 110-2 to determine the device's identity using a device authentication protocol and identity credentials. To complete the verification process, the verifier, in this example device 110-1, obtains the verification credentials 125 of the device 110-2 being verified and the identity of device 110-2 obtained through authentication. The exchange can also specify a mechanism to use for verification. Receipt of the credentials can be performed using secure communications. In one configuration, the verifier obtains a set of role indications of the device 110-2 being verified. The set of role indications that are assigned to a device may be collected from the authentication protocol, associated with the identity in some database, or associate with the type or some other attribute of the device. Thus, this example configuration of the system can verify the verification credentials 125 being presented by the device 110-2 being verified belong to that device, and can also verify that a role of the device 110-2 indicated within the verification credentials 125 matches an assigned role of the device 110-2 within the network 100.

In Step 203, the verifier authenticates the verification credentials 125 received from the device 110-2 to indicate that a configuration of the device was acceptable at the time of creation of the verification credentials 125 for that device 110-2. This will be further explained within the sub steps of 204 through 210.

In Step 204, the verifier decrypts the verification credentials 125 using cryptographic key information associated with a credential generator (i.e., certifier 120) which issued the verification credentials 125. The ability to authenticate the verification credentials 125 of a device 110-2 within the network 100 can be performed by obtaining the appropriate cryptographic tools such as a public key of the certifier 120. This allows the verifier to confirm the verification credentials have not been modified. Other techniques to allow such confirmation that the credentials have not been modified could include, for example, a checksum, hash or other value computed on the credentials. However, encryption allows the contents of the credentials to be sent in a form that cannot be viewed by an interceptor.

In Step 205, once decrypted, the verifier, in this case device 110-1, verifies that the validation credentials 125 of the device 110-2 have not expired. This can be done by examining the expiration date contained within the verification credentials 125, or by comparing the verification credentials 125 against a list of expired verification credentials 125. When verification credentials 125 are issued, they can, in one configuration, contain an expiration date to insure they are periodically updated. Verification credentials 125, which are out of date, could affect the result of the verification process, which will be further explained within the sub steps of 216 through 220.

In Step 206, the verifier compares the verification credentials 125 with credential revocation lists 170 to determine which verification credentials have been revoked. If the credentials have not been revoked, then verification passes. This will be further explained within the sub steps of 211 through 214.

In Step 207, the verifier specifies a result of the verification 209 and the device will either be allowed or denied access as appropriate to a requested resource such as network access or access to data. This will be further explained within the sub steps of 215 through 220.

In Step 208, the verifier compares the role indications of the device 110-2 with the role indications specified in the verification credentials 125 to verify the role of the device 110-2. Again, this can be to ensure that a device that presents credentials for one role is not trying to supersede its authority to act in a role that it is not allowed. In addition the verifier may apply local policy to addition verification attributes contained in the verification credential 125 to determine if there are any further constraints on the roles of the device 110-2.

Figure 6:
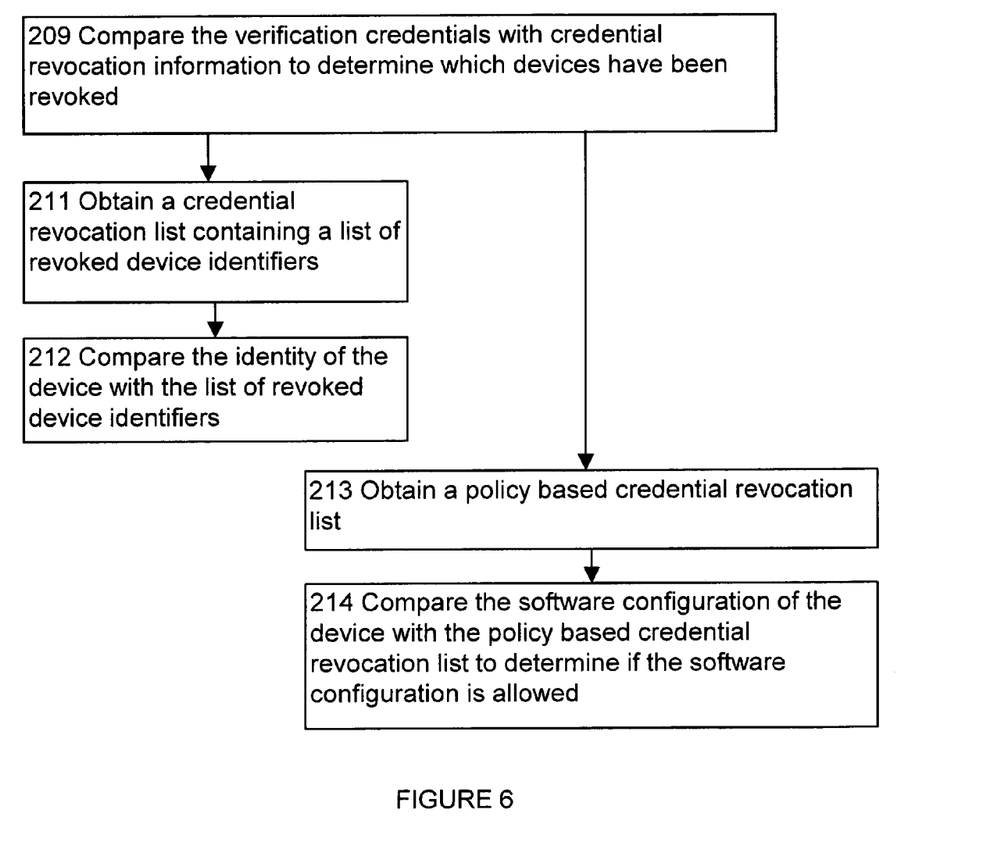
FIG. 6 illustrates a flowchart of a procedure performed by the system of FIG. 4 when the verifier process determines which devices have been revoked, according to one embodiment of the invention.

FIG. 6 is a flow chart of the steps to determine which verification credentials have been revoked. The verifier compares the verification credentials 125 of the device 110-2 being verified with credential revocation lists 170, which may reside on the database 130 that is remotely accessible (or is distributed beforehand to each device that requires the ability to verifier other devices).

In step 211, the verifier obtains the credential revocation lists 170 containing lists of revoked verification credential identifiers. These lists may contain credential identifiers of verification credentials 125 which did not pass the verification process, or devices whose verification credentials 125 are past the expiration date contained within those verification credentials 125, or identities (e.g., hashes) of credentials which are no longer acceptable.

In step 212, the verifier compares the identity of the credentials associated with device 110-2 being verified with the list of revoked verification credential identifiers contained within the credential revocation lists 170. To speed this process, there may be certain lists 170 for certain types of devices and other lists for other devices operating in other roles.

In step 213, the verifier can also obtain a policy based credential revocation list 170. The policy based credential revocation list 170 contains attributes of verification credentials 125, such as the version of the configuration policy used to generate the verification credentials. If a device's verification credentials 125 indicate that an older version of the policy was used or other attributes within the verification credentials 125 indicate that the current device configuration 115 falls outside of the device configurations defined as acceptable the verification credentials 125 are deemed as invalid.

In step 214, the verifier compares the attributes in the verification credential 110-2 being verified with the list of suspect verification attributes contained within the policy based credential revocation lists 170.

Figure 7:
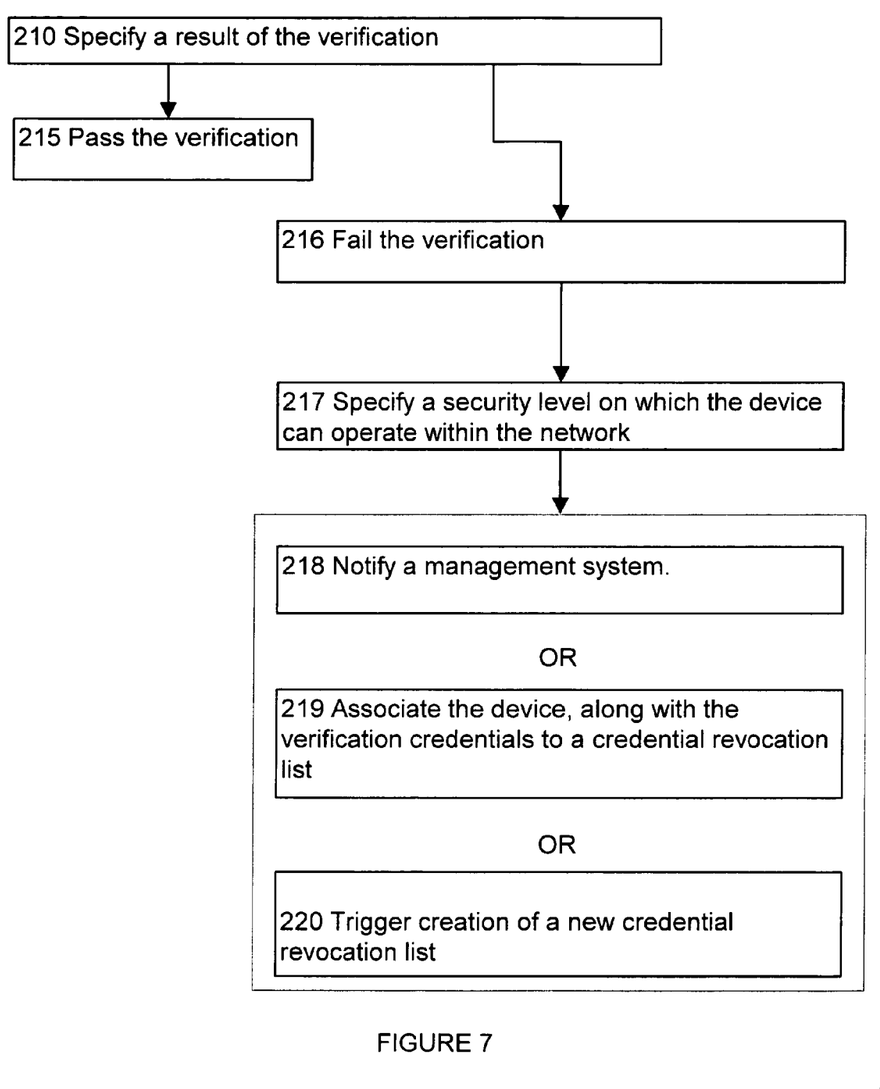
FIG. 7 illustrates a flowchart of a procedure performed by the system of FIG. 4 when the verifier process specifies the result of the verification, according to one embodiment of the invention.

FIG. 7 is a flow chart of the steps to specify the result of the verification. The result of the verification determines in which roles the device 110-2 can access the network and on which security level the device 100-2 can operate.

In step 215, verifier, in this example device 110-1, passes the verification for the device 110-2 being verified. The device 110-2 can now communicate with device 100-1 on the network 100 in the roles assigned to the device 110-2 at the security level allowed by the identity and verification credential evaluation.

Alternatively, in step 216, the verifier fails the verification for the device 110-2 being verified. Failure can result for many reasons including, but not limited to, expired credentials or credentials that indicate old or improper configurations (i.e., as identified by a hash of the configuration policy used to generate the credentials) which could cause communication problems or jeopardize security on the network 100. Improper configurations could include lack of current patches, lack of certain installed security or protection software (e.g., no or out of date virus protection) and/or lack of current installed software images (e.g., out of date browser software). Failure can also trigger an in-band process where the verifier proxies communication between the subject and the certifier to acquire new verification credentials 125.

In step 217, based on the outcome of the verification process, the verifier specifies a security level on which the device can operate within the network 100. Specification of a security level can include implementing selective routing of packets from the device that could not be fully verified. As an example, a device 110-2 might fail the verification, but still be able to communicate in a limited manner on the network 100, such as on a lower level that would not jeopardize the security level of certain parts of the network 100. The lower level may provide device 110-2 access to services to remediate its configuration.

In step 218, the verifier, in this example device 110-1, notifies a management system of the failure of the device 110-2 being verified. Note that this step is optional and this information can be used, for example, to notify other devices within the network 100, of the verification failure of the device 110-2, and can also be used to determine what actions need to be taken on the device 110-2 to allow the device 110-2 to pass future verifications. The verifier device 110-1 can also instruct device 110-2 to obtain valid verification credentials 125 from the configuration certifier 120.

In step 219, assuming a verification failure has occurred, the verifier associates the verification credentials 125 of the device 110-2, along with the verification credentials 125 to a credential revocation list 170. The credential revocation list 170 will be used during the verification process by devices acting as a verifier in the future.

In step 220, the verifier triggers creation of a new credential revocation list 170. In this way, devices which are acting as a verifier at a later time will have access to updated credential revocation lists 170 during the authentication steps of the verification process as explained above.

In one alternative configuration, upon failing verification, the verifier can trigger an in-band verification process and operate as a proxy for communication to allow the device being verified to obtain proper verification credentials. In such an example configuration, the device being verified may not have direct access to the network (and the Certifier at this point). So failing the verification in this example triggers an alternate verification process.

While computer systems and methods have been particularly shown and described above with references to configurations thereof, it will be understood by those skilled in the art that various changes in form and details may be made therein without departing from the scope of the invention. Accordingly, the present invention is not intended to be limited by the example configurations provided above.

The invention claimed is:

1. A method, comprising:
providing device configuration data to a device configuration certifier from a device that will seek access to a computer network, where the device configuration data describes a configuration of the device that will seek access to the computer network and a role to be taken by the device while accessing the computer network, and where the device configuration data does not include user identity information;

receiving a device configuration verification credential from the configuration certifier, where the device configuration verification credential confirms that the device configuration conforms with a device configuration policy associated with network security in light of the role to be taken by the device, and where the device configuration verification credential is unrelated to user identity and user authentication;

providing the device configuration verification credential to a network device in data communication with the computer network, where the network device controls access to the computer network based, at least in part, on the device configuration verification credential; and selectively accessing the computer network upon the network device verifying the device configuration verification credential;

wherein the method is performed by one or more processors.

2. The method of claim 1, comprising authenticating the device configuration verification credential.

3. The method of claim 2, where authenticating the device configuration verification credential comprises:
confirming the identity of the device providing the device configuration verification credential;
confirming that the device configuration verification credential has not been modified; and
confirming that the device configuration verification credential has not expired.

4. The method of claim 2, where verifying the device configuration verification credential comprises:
confirming that a role sought to be played by the device agrees with the role identified in the device configuration verification credential.

5. The method of claim 1, where the device configuration data comprises a software configuration of the device.

6. The method of claim 1, where the device configuration verification credential comprises data describing a role allowed to be played by the device and data describing a version of a configuration policy used to determine the role.

7. The method of claim 1, comprising:
specifying a security level at which the device is allowed to access the computer network, where the security level is based, at least in part, on the device configuration verification credential.

8. An apparatus, comprising:
a memory;
a processor;
a communications interface; and
an interconnection mechanism coupling the memory, the processor and the communications interface;
where the memory is encoded with a verification application that when executed on the processor produces a verification process that causes a computerized device to perform a method, the method comprising:
requesting a verification credential of a device in a network, where the verification credential was provided to the device at a previous time by a configuration certifier, and where the verification credential depends on a role to be played by the device in the network and by a configuration of the device;
receiving the verification credential from the device; and
authenticating that the verification credential received from the device indicates that the configuration of the device was acceptable at the time of creation of the verification credential.

9. The apparatus of claim 8,
where receiving the verification credential comprises:
authenticating the device to determine its identity using a device authentication protocol; and
where authenticating the verification credential comprises:
confirming the verification credential has not been modified since creation by the configuration certifier;
verifying that the validation credential has not expired;
verifying that the validation credential contains the identity of the device;
obtaining a role indication of the device;
comparing the role indication of the device with a role indication specified in the verification credentials to verify the role of the device;
comparing the verification credential with credential revocation information to determine whether the device has been revoked; and
specifying a result of the verification.

10. The apparatus of claim 9, where the configuration certifier comprises:
a second memory;
a second processor;
a second communications interface
a second interconnection mechanism coupling the second memory, the second processor and the second communications interface
where the second memory is encoded with a certification application that when executed on the second processor causes the second processor to execute a certification method, the certification method comprising:
receiving a current device configuration from the device in the network
evaluating the current device configuration of the device in the network, the evaluation including verifying the configuration of the device with respect to a role of the device within the network and comparing an image of the device against a list of acceptable device configurations;
issuing a verification credential indicating the current configuration of the device at the time of creation of the verification credential for that device which includes transferring the verification credential to the device, the verification credential indicating that the current device configuration is certified at the time of issuance of the verification credential; and
storing the verification credential.

11. The apparatus of claim 10, where evaluating the current device configuration includes:
obtaining a role indication of the device specified in the current device configuration;
determining if the role indication is acceptable for the device, and
if so:
obtaining the image of the device specified in the current device configuration, the image indicating a software configuration of the device that identifies specific software programs installed within the device; and
for acceptable device configurations that correspond to the role indication of the device, comparing the software configuration of the device to the list of acceptable device configurations for that role to determine if the software configuration is acceptable for that device.

12. A non-transitory computer-readable medium storing one or more sequences of instructions which, when executed by one or more processors, cause the one or more processors to perform:
providing device configuration data to a device configuration certifier from a device that will seek access to a computer network, where the device configuration data describes a configuration of the device that will seek access to the computer network and a role to be taken by the device while accessing the computer network, and where the device configuration data does not include user identity information;

receiving a device configuration verification credential from the configuration certifier, where the device configuration verification credential confirms that the device configuration conforms with a device configuration policy associated with network security in light of the role to be taken by the device, and where the device configuration verification credential is unrelated to user identity and user authentication;

providing the device configuration verification credential to a network device in data communication with the computer network, where the network device controls access to the computer network based, at least in part, on the device configuration verification credential; and selectively accessing the computer network upon the network device verifying the device configuration verification credential.

13. The non-transitory computer-readable medium of claim 12, wherein the non-transitory computer-readable storage medium further comprises instructions which, when executed, cause the one or more processors to perform authenticating the device configuration verification credential.

14. The non-transitory computer-readable medium of claim 13, wherein the instructions for performing the authenticating the device configuration verification credential further comprise instructions which, when executed, cause the one or more processors to perform:
confirming the identity of the device providing the device configuration verification credential;
confirming that the device configuration verification credential has not been modified; and
confirming that the device configuration verification credential has not expired.

15. The non-transitory computer-readable medium of claim 13, wherein the instructions for performing the verifying the device configuration verification credential further comprise instructions which, when executed, cause the one or more processors to perform confirming that a role sought to be played by the device agrees with the role identified in the device configuration verification credential.

16. The non-transitory computer-readable medium of claim 12, wherein the device configuration data comprises a software configuration of the device.

17. The non-transitory computer-readable medium of claim 12, wherein the device configuration verification credential comprises data describing a role allowed to be played by the device and data describing a version of a configuration policy used to determine the role.

18. The non-transitory computer-readable medium of claim 12, wherein the non-transitory computer-readable storage medium further comprises instructions which, when executed, cause the one or more processors to perform specifying a security level at which the device is allowed to access computer network, wherein the security level is based, at least in part, on the device configuration verification credential.

* * * * *